Patented May 22, 1923.

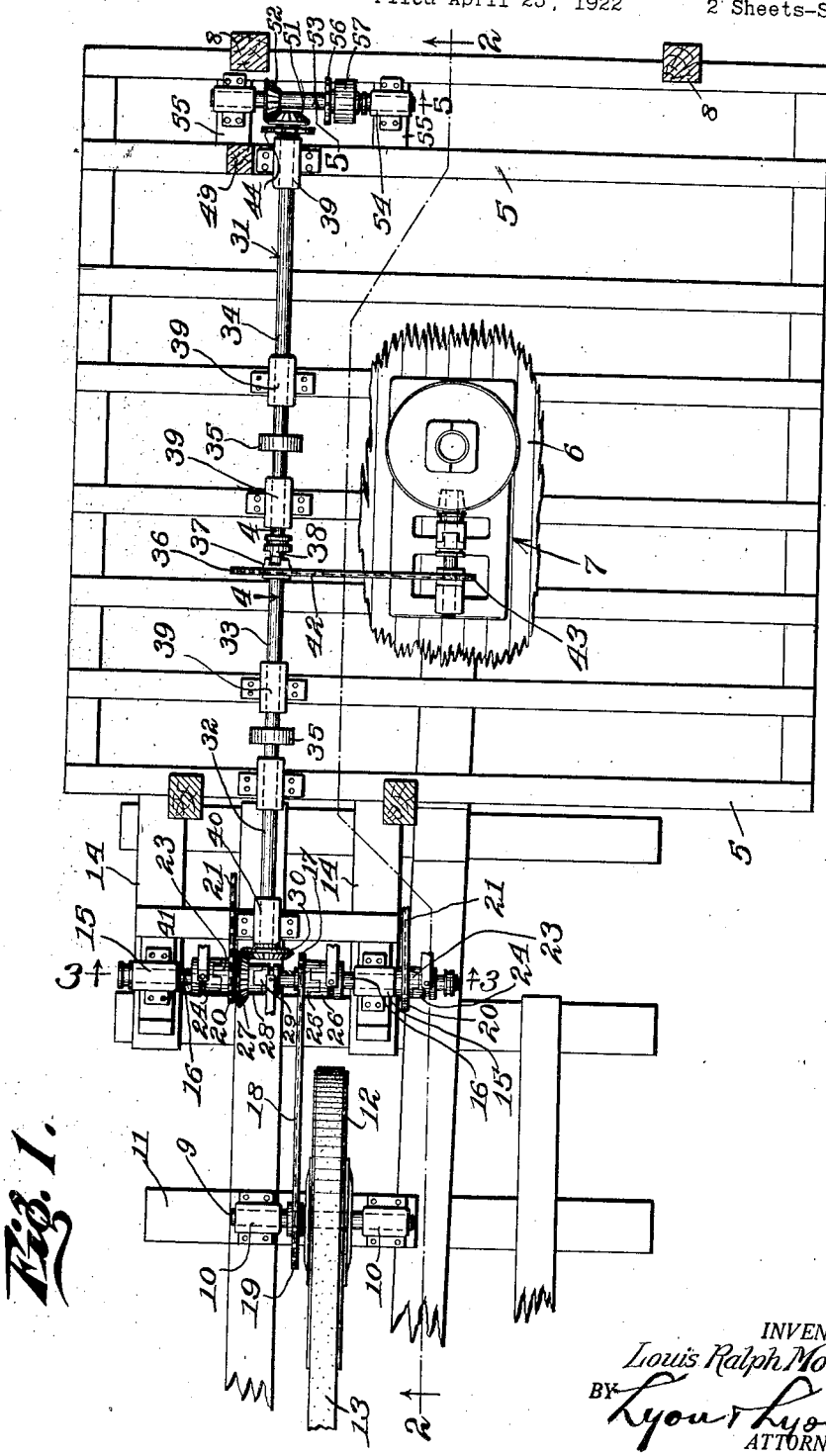

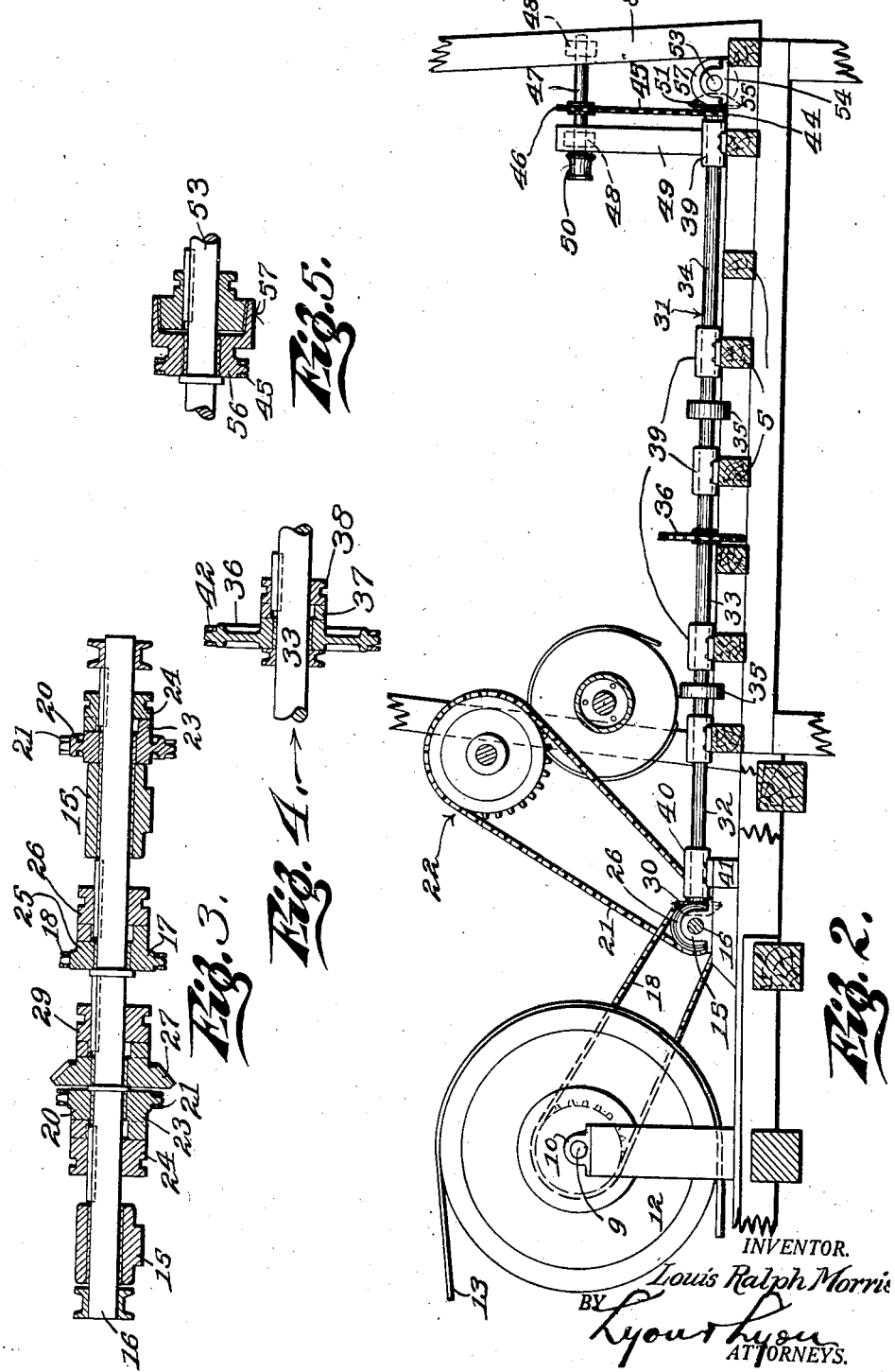
May 22, 1923.
L. R. MORRIS
1,456,186
SHAFT DRIVE FOR COMBINATION DRILLING AND WELL PULLING
Filed April 25, 1922    2 Sheets-Sheet 2
INVENTOR.
Louis Ralph Morris
BY
Lyon & Lyon
ATTORNEYS.

1,456,186

UNITED STATES PATENT OFFICE.

LOUIS RALPH MORRIS, OF TAFT, CALIFORNIA.

SHAFT DRIVE FOR COMBINATION DRILLING AND WELL PULLING.

Application filed April 25, 1922. Serial No. 556,388.

*To all whom it may concern:*

Be it known that I, LOUIS RALPH MORRIS, a citizen of the United States, residing at Taft, in the county of Kern and State of California, have invented a new and useful Shaft Drive for Combination Drilling and Well Pulling, of which the following is a specification.

This invention relates to mechanism for operating the calf wheels or draw works, the bull wheel and rotary of a combination drilling rig, and an object of the invention is to eliminate the objectionable bull ropes which, as is well known, are dangerous to the safety of the workmen about the well.

Another object is to provide a simple, compact shaft drive with an arrangement of shafts and clutches that will effect the desired results, that is both rotary and standard drilling and well pulling.

The accompanying drawings illustrate the invention:

Figure 1 is a plan view of a shaft drive embodying the invention, the cat head, its shaft and its operating sprocket chain and the draw works being omitted.

Fig. 2 is a sectional elevation on the line indicated by 2—2, Fig. 1.

Figs. 3, 4 and 5 are enlarged sectional details on the lines indicated by 3—3, 4—4, and 5—5, Fig. 1.

The derrick floor-supporting timbers are indicated at 5 and a fragment of the floor at 6. The rotary, which is not a part of the present invention but which is driven thereby, is indicated at 7 and the bull-wheel posts are indicated at 8. Outside of the derrick is the power shaft 9 journaled in bearings 10 mounted on a support 11. On the shaft 9 is the band wheel 12 operated from a prime mover, not shown, by the belt 13. The parts 9 to 13 inclusive are not portions of the present invention, but are illustrated for the purpose of more clearly showing how the invention operates.

Between the support 11 and the derrick are positioned supports 14 on which are mounted bearings 15 to journal a shaft 16. The shaft 16 carries a sprocket wheel 17 which may be connected by a sprocket chain 18 to a sprocket wheel 19 mounted on the power shaft 9.

A pair of loose sprockets 20 are mounted on the shaft 16 and are adapted to be connected by sprocket chains 21 to the draw works indicated at 22 in Figure 2. The draw works 22 are not a portion of the present invention and may be of any suitable construction. Calf wheels may, of course, be operated instead of the draw works, by the chains. In the present instance provision is made to operate an ordinary two-speed draw works at any one of four different speeds, one of the chains 21 operating a larger sprocket wheel on the draw works than the other sprocket chain.

The sprocket wheels 20 each forms a jaw clutch member 23, and other jaw clutch members 24, splined to the shaft 16, are adapted to be thrown into and out of engagement with the clutch members 23 so as to operate either sprocket chain 21 without the other one. The sprocket wheel 17 is loose on the shaft 16 and may be operably connected thereto by a clutch member 25 on the sprocket wheel 17 adapted to engage a clutch member 26 which is splined to the shaft 16. Mounted loose on the shaft 16 is a bevel gear 27 which may be operably connected by a jaw clutch member 28 on the gear 27 to a jaw clutch member 29 splined to the shaft 16. The bevel gear 27 drives a bevel gear 30 on a shaft 31, which, in this instance, comprises sections 32, 33, 34. The intermediate section 33 is detachably connected with the end sections 32, 34 by flexible couplings 35.

Loose on the shaft section 33 is a sprocket wheel 36 which may be operably connected with said shaft section by a jaw clutch member 37 engageable with a jaw clutch member 38 driven by the shaft section 33.

The shaft 31 is rotatably mounted in the derrick, being journaled in bearings 39 mounted on the derrick floor supports 5. The shaft 31 projects outside of the derrick, there being an outboard bearing 40 for the shaft section 32, said bearing being mounted on a support 41 which rests on the supports 14. The sprocket wheel 36 is operably connected by a sprocket chain 42 to the sprocket wheel 43 of the rotary 7.

On the shaft section 34 is a sprocket wheel 44 connected by a sprocket chain 45 to sprocket wheel 46 on a shaft 47 which is journaled in bearings 48, one of said bearings being mounted on one of the bull wheel posts 8 and the other bearing being mounted on a post 49 extending up from one of the floor supports 5. The shaft 47 carries the cat head 50.

The shaft section 34 is provided with a bevel gear 51 in mesh with a bevel gear 52 on a shaft 53. The shaft 53 is journaled in bearings 54 mounted on supports 55. On the shaft 53 is a loose sprocket 56 which may be operably connected with the shaft 53 by a friction clutch 57. The friction clutch 57 need not be shown and described in detail herein, since such type of clutch is well known.

The purpose of the sprocket wheel 56 is to drive a sprocket chain, not shown, connected with the shaft on which the bull wheel, not shown, is mounted. The construction of the bull wheel constitutes no part of this present invention, and therefore it need not be described herein.

The invention operates as follows:

It will be assumed, for example, that the various clutches are thrown out and that the band wheel 12 is operating. If the well driller desires to employ the rotary system of drilling, the clutch members 26, 29 and 38 will be thrown in, thus causing operation of the shafts 16 and 31 and the sprocket chain 42. When the rotary is employed either the clutch 57 may be thrown out so that the bull wheel will not operate, or the shaft section 34 may be omitted, or disconnected at the coupling 35.

In event of the driller desiring to drill with standard tools, he will throw in the clutch members 26, 29 and throw out the clutch member 38, thus rotating the shafts 16, 31, 53.

The draw works is generally provided with a two-speed driving mechanism and, when the operator desires to use the draw works, he will throw in the clutch member 26 and, also, either one of the clutch members 24 and will throw out the clutch member 29. He will thus be enabled to obtain two different speeds of the draw works by throwing in one of the clutches 24 and he will obtain two other speeds by throwing in the other clutch member 24. Instead of the draw works, calf wheels may be operated by the chains 21.

From the foregoing it will be understood that it will not be necessary to install section 34 of the shaft 31, the shaft 53 and the bull wheels if the well is to be drilled to completion with the rotary system. The shaft section 34 may be readily disconnected from the section 33 at the coupling 35. If the well, however, is partially drilled with the rotary and then is to be completed with the cable tools, the shaft section 34, the shaft 53 and the bull wheels will be installed, and the shaft section 34 will not be connected with the shaft section 33 until such time as it is desired to begin work with the cable tools. If the well is to be drilled to completion with cable tools, the sprocket wheel 36 and the clutch members 37, 38 need not be installed on the shaft 31.

By providing the clutch 37, 38, the cathead and bull wheels can be operated without turning the sprocket chain 42. The advantage in this is that the chain, being idle, can not injure men working near the chain. If the chain were operating there would be considerable danger of men near the chain being injured either by touching the moving chain or by reason of the chain breaking and striking the men.

The purpose of the friction clutch 57 will be clear when it is considered that, in lowering the tools into the well, they will drop as fast as the driller permits by releasing the brake on the bull wheel and that, in order to prevent over-speeding of the machinery that drives the bull wheel operating sprocket chain, the clutch 57 can be disengaged so that the sprocket chain and two sprockets, forming the connection between the shaft 53 and the bull wheel shaft, can turn independently of the shaft 53 and its driving mechanism.

I claim:

1. In a shaft drive for combination drilling and well pulling, the combination with a derrick of a shaft rotatably mounted therein and projecting outside of the derrick, an outboard bearing for the projecting end of the shaft, a shaft extending at a right angle to the first shaft, a bevel gear loose on the second shaft, a bevel gear on the first shaft engaging the first gear, clutch means between the loose gear and the second shaft, a sprocket wheel loose on the second shaft, clutch means between the sprocket wheel and the second shaft, a sprocket wheel on the first shaft, a second bevel gear on the first shaft, a third shaft journaled in the derrick at a right angle to the first shaft, a bevel gear on the third shaft in mesh with the last bevel gear, and a sprocket wheel on the third shaft.

2. In a shaft drive for combination drilling and well pulling, the combination with a derrick of a shaft rotatably mounted therein and projecting outside of the derrick, an outboard bearing for the projecting end of the shaft, a shaft extending at a right angle to the first shaft, a bevel gear loose on the second shaft, a bevel gear on the first shaft engaging the first gear, clutch means between the loose gear and the second shaft, a sprocket wheel loose on the second shaft, clutch means between the sprocket wheel and the second shaft, a sprocket wheel loose on the first shaft, clutch means between the last sprocket wheel and the first shaft, a second bevel gear on the first shaft, a third shaft journaled in the derrick at a right angle to the first shaft, a bevel gear on the third shaft in mesh with the last bevel gear, and a sprocket wheel on the third shaft.

3. In a shaft drive for combination drilling and well pulling, the combination with a derrick of a shaft rotatably mounted therein and projecting outside of the derrick, an outboard bearing for the projecting end of the shaft, a shaft extending at a right angle to the first shaft, a bevel gear loose on the second shaft, a bevel gear on the first shaft engaging the first gear, clutch means between the loose bevel gear and the second shaft, sprocket wheels loose on the second shaft, clutch means between each of the sprocket wheels and the second shaft, a sprocket wheel on the first shaft, a second bevel gear on the first shaft, a third shaft journaled in the derrick at a right angle to the first shaft, a bevel gear on the third shaft in mesh with the last bevel gear, and a sprocket wheel on the third shaft.

4. In a shaft drive for combination drilling and well pulling, the combination with a derrick of a shaft rotatably mounted therein and projecting outside of the derrick, an outboard bearing for the projecting end of the shaft, a shaft extending at a right angle to the first shaft, a bevel gear loose on the second shaft, a bevel gear on the first shaft engaging the first gear, clutch means between the loose gear and the second shaft, a sprocket wheel loose on the second shaft, clutch means between the sprocket wheel and the second shaft, a sprocket wheel on the first shaft, a second bevel gear on the first shaft, a third shaft journaled in the derrick at a right angle to the first shaft, a bevel gear on the third shaft in mesh with the last bevel gear, a sprocket wheel on the third shaft, a fourth shaft rotatably mounted in the derrick above the level of the first shaft and parallel therewith, a cat head on said fourth shaft, a sprocket wheel on the fourth shaft, a sprocket wheel on the first shaft, and a sprocket chain connecting the last two sprocket wheels.

5. In a shaft drive for combination drilling and well pulling, the combination with a derrick of a shaft rotatably mounted therein and projecting outside of the derrick, an outboard bearing for the projecting end of the shaft, means connected with the shaft to drive said shaft, a bevel gear on said shaft, a second shaft rotatably mounted in the derrick at a right angle to the first shaft, a bevel gear on the second shaft in mesh with the first bevel gear, a sprocket wheel loose on the second shaft, clutch means between the sprocket wheel and the second shaft, a sprocket wheel loose on the first shaft, and clutch means between the last sprocket wheel and the first shaft.

6. In a shaft drive for combination drilling and well pulling, the combination with a derrick of a shaft rotatably mounted therein and projecting outside of the derrick, an outboard bearing for the projecting end of the shaft, other shafts adjacent the respective ends of the first shaft and rotatably mounted at right angles thereto, loose sprocket wheels on the respective shafts, and clutch means between each of the shafts and its associated sprocket wheel.

7. In a shaft drive for combination drilling and well pulling, the combination with a derrick of a shaft rotatably mounted therein and projecting outside of the derrick, an outboard bearing for the projecting end of the shaft, a shaft extending at a right angle to the first shaft, means releasably connecting the first and second shafts, a sprocket wheel loose on the second shaft, clutch means between the sprocket wheel and the second shaft, the first shaft comprising sections, a coupling detachably connecting the shaft sections, a sprocket wheel loose on one of the shaft sections, clutch means between the last sprocket wheel and the associated shaft section, and a gear wheel on the other shaft section.

Signed at Taft, California this 17th day of April 1922.

LOUIS RALPH MORRIS.

Witnesses:
A. B. SMITH,
P. A. MORSTAD.